United States Patent [19]

Stubbings

[11] 4,055,102
[45] Oct. 25, 1977

[54] BAND AND SABER SAW ARRANGEMENT

[75] Inventor: James Henry Stubbings, Rockville, Md.

[73] Assignee: Potomac Applied Mechanics, Inc., Bethesda, Md.

[21] Appl. No.: 666,172

[22] Filed: Mar. 12, 1976

[51] Int. Cl.² .................... B27B 11/00; B27B 15/00
[52] U.S. Cl. ................................... 83/749; 83/790
[58] Field of Search ............... 83/749, 750, 781, 790, 83/793, 809, 425.3

[56] References Cited

U.S. PATENT DOCUMENTS

| 382,330 | 5/1888 | Snedeker | 83/790 X |
|---|---|---|---|
| 1,834,684 | 12/1931 | Dannehower | 83/790 |
| 2,651,335 | 9/1953 | Stagg | 83/425.3 |
| 3,954,036 | 5/1976 | Bech | 83/749 |

FOREIGN PATENT DOCUMENTS

| 342,792 | 2/1931 | United Kingdom | 83/439 |

Primary Examiner—Willie G. Abercrombie
Attorney, Agent, or Firm—Cushman, Darby & Cushman

[57] ABSTRACT

A band saw and a saber saw are both provided on the same table top working surface, and both are operable at the same time so that a pair of parallel cuts (either arcuate or straight) may be made in a workpiece at the same time. The saber saw blade has a vertical position thereof which is parallel to the vertical plane of the band saw blade, and the saber saw is adjustable with respect to the band saw to provide for cutting pieces of material of different widths. The saber saw blade is also pivotal from the vertical position thereof to a horizontal position wherein it is below the table top working surface, so that the band saw alone may be used. A workpiece resting member associated with the saber saw allows for pivoting of a workpiece with respect thereto to have an arcuate cut made therein by the band saw when the saber saw blade is in its horizontal position.

10 Claims, 4 Drawing Figures

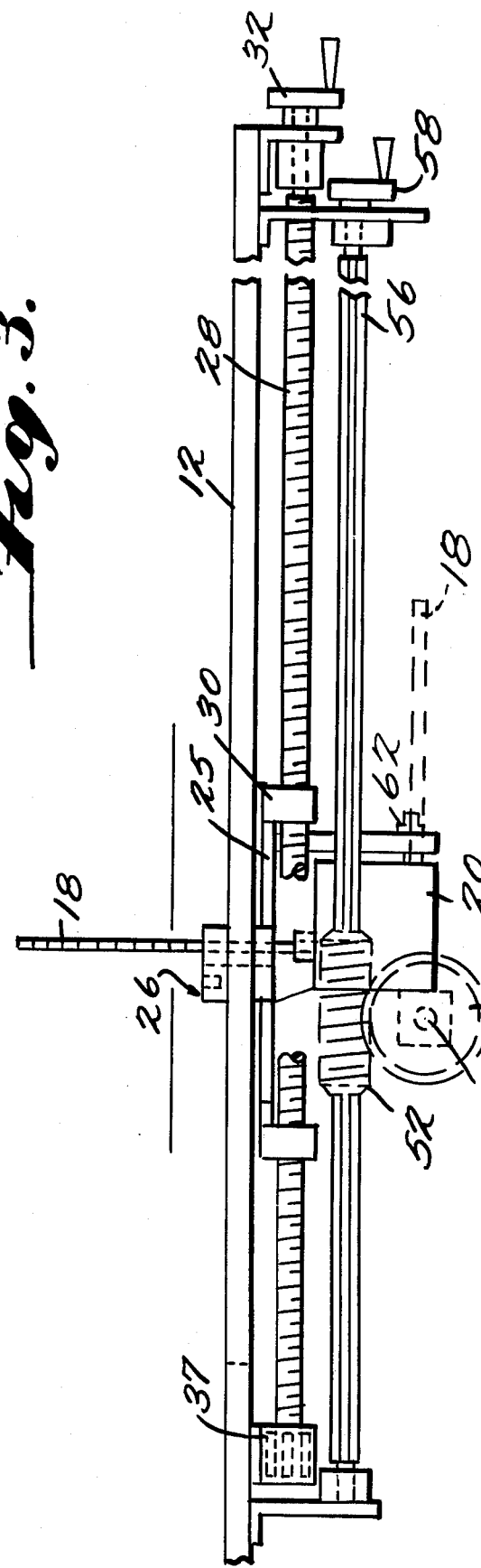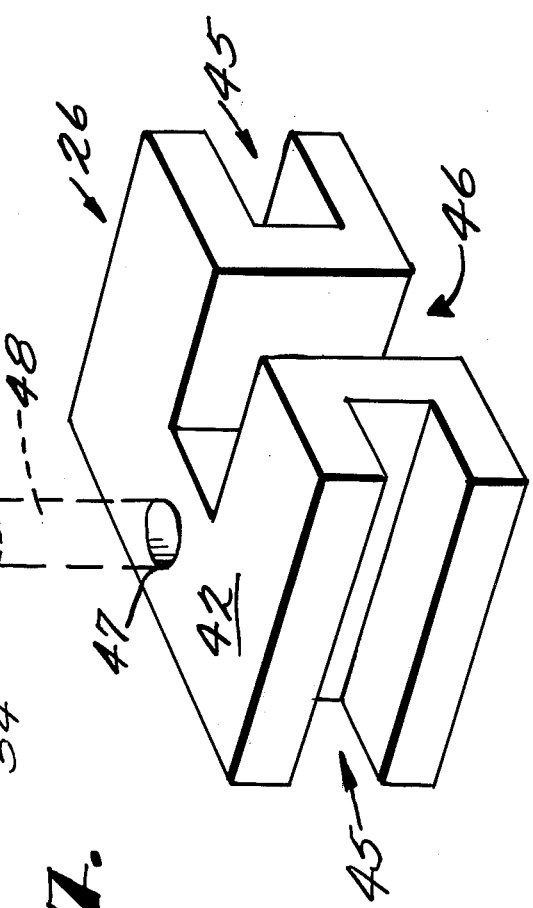

BAND AND SABER SAW ARRANGEMENT

BACKGROUND AND SUMMARY OF THE INVENTION

The invention relates to an apparatus for making two truly parallel cuts in a piece of sheet material or the like at the same time. Conventionally, especially in the sheet metal cutting trade, in order to make parallel cuts in a sheet one cut must be made, and then the other cut only after the first cut is made and the sheet realigned. It is difficult to make the second cut parallel to the first cut, especially when the cuts are arcuate, and expensive accessory means often must be employed for facilitating the making of the second parallel cut, or very skilled craftsmen must be employed. Also, the process is relatively time consuming since two separate aligning and cutting procedures must be followed.

According to the apparatus of the present invention, the above-mentioned problems associated with the prior art have been eliminated to a large extent. When two parallel cuts are to be made, they may be made at the same time, and the making of one cut insures that the other cut is truly parallel thereto. According to the invention, a band saw and a saber saw are provided, both extending through a working surface table top for movement in parallel vertical planes when making cuts in sheet material or the like. The leading edges of both saw blades are aligned so that a workpiece will encounter them at substantially the same time, and power means are provided for operating them at the same time. The saber saw is adjustable in a horizontal plane with respect to the band saw so that any desired width of material may be cut. Also, the saber saw blade is mounted so that it can pivot from its vertical, cutting position, to a substantially horizontal position below the table top, whereby the band saw can be used alone. While there have been some prior art proposals to provide more than one saw associated with a working surface — see U.S. Pat. Nos. 123,211 and 2,815,775, for example, such proposals have in general required that only one saw be operable at a time, and thus two parallel cuts could not be made at the same time. Also, such prior art saws have not been of the type that are conducive to making parallel cuts that are arcuate — as opposed to the present invention wherein the band saw and saber saw blades have substantially the same effective cutting action, and are well suited to work with each other to make parallel arcuate cuts — and such prior art saws have not been adjustable with respect to each other to allow for cutting sheet sections of different widths from a sheet of material.

According to the present invention any suitable means may be provided for moving the saber saw with respect to the band saw for adjusting the distance between the parallel cuts to be made thereby and such means may include a slot disposed in the table top for guiding the linear movement of the saber saw, a rotatable screw rod disposed under the table, and means associated with the saber saw for surrounding the screw rod and transforming the rotary movement thereof to linear movement of the saber saw. The saber saw pivoting means may include a shaft for mounting the saber saw for pivoting movement, a gear member disposed on the end of the shaft and cooperating with a worm gear, and a keyed shaft for supporting the worm gear for rotation while still allowing relative linear movement of the worm gear depending upon the position to which the saber saw is moved by the means for adjusting the distance between it and the band saw. Also, a workpiece resting means may be associated with both the band saw and saber saw for particular use therewith when sheet metal is to be cut, each workpiece resting means providing a surface that is parallel to and elevated above, the table top. The workpiece resting means associated with the saber saw can also provide a guiding function for linear movement of the saber saw, and an opening can be provided therein for receipt of a pivot post to allow a workpiece to be pivoted thereabout to have an arcuate cut made therein by the band saw when the saber saw blade is in its unoperative, horizontal position.

The primary object of the present invention is to provide practical apparatus for making two truly parallel cuts spaced any distance and either arcuate or straight — in sheet material or the like. This and other objects of the invention will become clear from an inspection of the detailed description of the invention, and from the appended claims.

BRIEF DESCRIPTION OF THE DRAWINGS

FIG. 3 is a detailed view taken along lines 3—3 of FIG. 2 showing the saber saw assembly of FIG. 2 from another perspective; and FIG. 4 is a detailed perspective view of an exemplary workpiece resting means associated with the saber saw assembly of FIGS. 2 and 3.

DETAILED DESCRIPTION OF THE INVENTION

Figure 1:
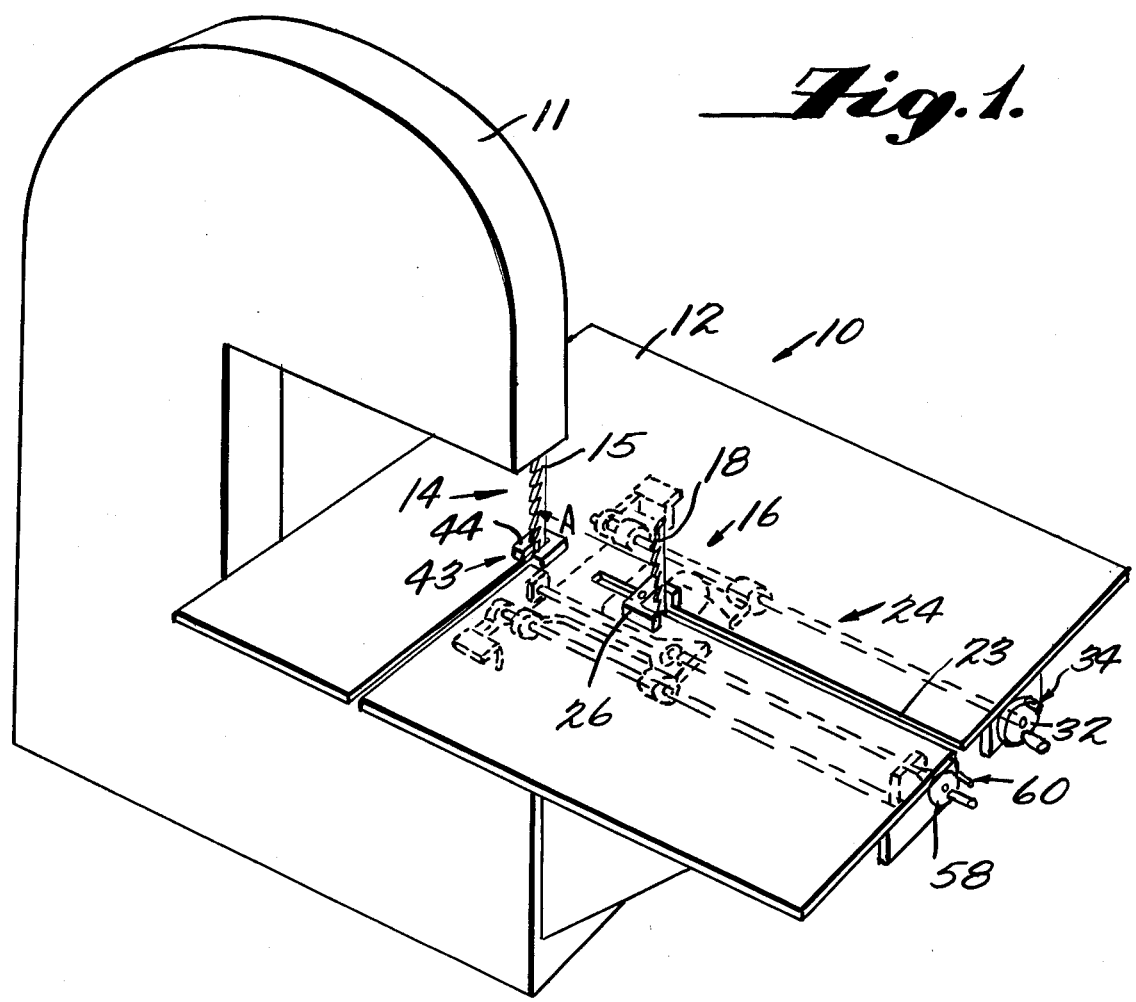
FIG. 1 is a perspective schematic view of exemplary sheet material cutting apparatus according to the present invention.

Sheet material cutting apparatus according to the present invention is shown generally at 10 in FIG. 1. The apparatus comprises several main components: a generally horizontally disposed table top 12; a band saw 14 having a toothed blade 15 thereof that is disposed in a generally vertical plane and passes through the table top 12; a saber saw assembly 16 having a toothed blade 18 thereof that is adapted to be disposed in a generally vertical plane parallel to the vertical plane of the band saw blade 15, and passing through the table top 12 when in the vertical position; means 22 for mounting the saber saw assembly 16 to provide adjustment of the horizontal spacing A of the saber saw assembly 16 from the vertical plane of the band saw blade 15; and power means — such as a motor disposed in band saw housing 11 and saber saw 20 — for operating the band saw and the saber saw (when in a generally vertical plane) at the same time so that a workpiece will have two truly parallel cuts made therein at the same time when brought into engagement with the saw blades 15, 18. According to the present invention, the two truly parallel cuts made in a sheet of material to be cut may be either straight or arcuate, and adjustment of the distance of the assembly 16 from the blade 15 allows any desired dimensions to be provided for the sheet material being cut.

The saber saw blade 18 may be of any conventional type having the teeth thereof extending in the same direction as the teeth of the band saw blade 15, and a conventional motor 20 for the saber saw moving the blade 18 in an up and down reciprocating motion. The means 22 for mounting the saber saw assembly 16 to allow adjustment of the horizontal spacing A of the assembly 16 from the blade 15 includes a slot 23 formed in the table top 12 extending in a horizontal plane and generally perpendicular to the vertical plane of the blade 15. The slot 23 is disposed so that the teeth of the blade 18 are substantially even with the teeth of the blade 15 so that a sheet of material to be cut is generally brought into engagement with both blades 15, 18 at the same time when the sheet is disposed with a leading edge thereof substantially parallel to the front edge B of the table top 12. The means 22 also includes a mounting bracket 25 for mounting the assembly 16, a screw-threaded rod 28 disposed below the table top 10 and extending parallel to the slot 23, and a workpiece resting means and guide member 26 attached to the bracket 25. A conventional means 30 associated with the bracket 25 surrounds the rod 28 and transforms the rotary movement of the rod 28 into linear movement of the bracket 25 toward and away the plane of the blade 15. Any suitable means, such as hand-crank 32, may be provided for rotating the rod 28 in either direction to thereby move the bracket 25 in its linear path, and a detent or latching means 34 may be provided for holding the crank 32 in a particular position to which it is moved. It is also preferred that a smooth guide rod 36 be provided for guiding the linear movement of the bracket 25, the guide rod 36 being disposed on the opposite side of the slot 23 of the screw rod 28, and extending parallel to the slot 23 and rod 28, and a collar 40 attached to bracket 25 receiving the rod 36 to provide for the guiding function thereof. Brackets 37, 38 or the like may be provided at either end of rods 28, 36 respectively, and attached to the bottom of the table top 12 for mounting the rods 28, 36.

The combination guide and workpiece resting means 26, which is shown in detail in FIG. 4, detached from the bracket 25, has an upper flat generally horizontal disposed portion 42 thereof which extends above the top of the table top 12. This portion 42 is raised above the table top when the blades 15, 18 are to be used to cut sheet metal since it is desirable that the sheet metal be elevated off the table top 12, and since accessory clamps and the like that are conventionally used with sheet metal during cutting thereof require that the sheet metal be elevated during cutting. A similar workpiece resting means 43 is preferably associated with the band saw 14 also, the means 43 having an upper surface 44 thereof that is flat and generally horizontally disposed, and spaced above the table top 12. When the blades 15, 18 are used for cutting sheet material besides sheet metal, or for cutting other types of workpieces, it is not necessary that the elevated flat surfaces 43, 44 be provided since then it is desirable that the workpiece be disposed directly on the table top 12. Therefore, the means 43 may be made detachable, as may the means 26.

Figure 2:
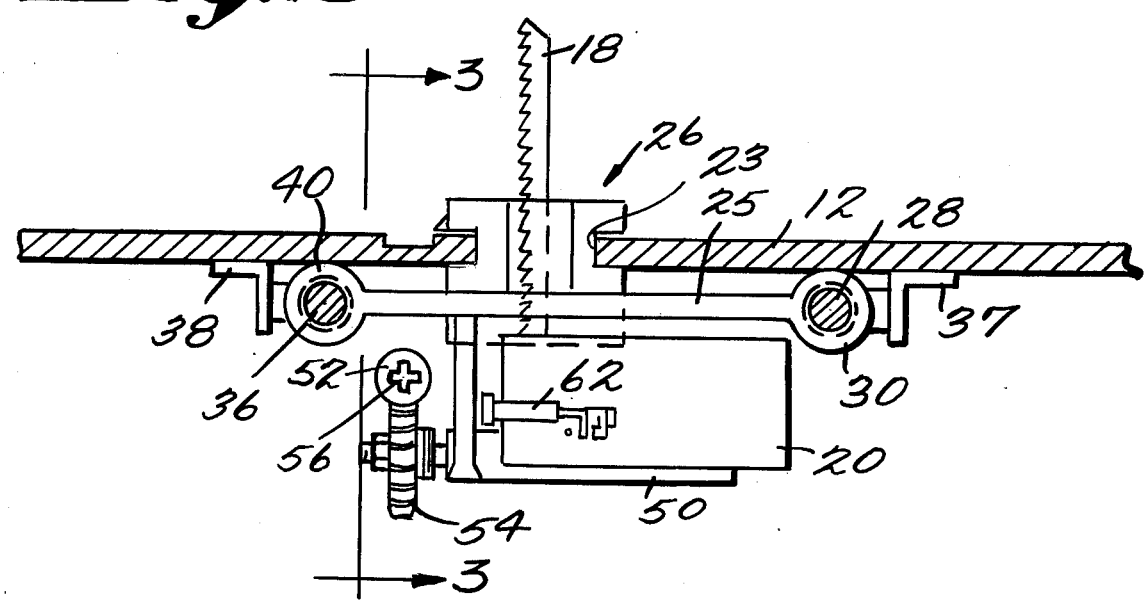
FIG. 2 is a detailed view showing an exemplary saber saw assembly according to the present invention partly in elevation and partly in cross-section.

The workpiece resting means 26 also provides a guiding function for the assembly 16, a pair of slots 45 being provided in the means 26 for engaging the edges of the table top 10 defining the slot 23 therein (see FIG. 2). Of course an opening 46 is provided for the blade 18, the opening 46 allowing the pivoting of the blade 18 from a vertical position to a horizontal one. Also the means 26 may have an opening 47 formed therein for receipt of a pivot post (i.e., a nail 48 — shown in dotted line in FIG. 4 — or the like) therein when the blade 18 is in a horizontal position. When only the band saw 14 is used for cutting, then the means 26 is still functional, allowing the pivoting of a piece of metal about the pivot post 48 associated therewith. Of course, the means 26 is still horizontally adjustable with respect to the blade 15 (whether the blade 18 is vertical or horizontal) so that the width of a member that is to have an arcuate cut made therein may readily be adjusted.

In order to allow utilization of the means 26 for providing an adjustable pivot point for a piece of sheet material to be cut, and in order to provide for utilization of the band saw 14 alone in general, preferably means 49 are provided for pivoting the blade 18 from a generally vertical position, shown in solid line in FIG. 3, to a generally horizontal position, shown in dotted line in FIG. 3. The pivot providing means 49 preferably comprises a shaft 50 or the like which is affixed to motor 20 for the saber saw assembly 16, and mounts the assembly 16 for pivotal movement with respect to the bracket 25. Attached to a free end of the shaft 50 is a gear member 54, which gear member cooperates with a worm gear 52 or the like. The worm gear 52 is mounted on a keyed shaft 56 (see FIGS. 2 and 3 especially) and is always in engagement with the gear member 54 so that rotation of the shaft 56 results in rotation of the gear member 54, and thus pivoting of the assembly 16. Since the shaft 56 is keyed, the worm gear 52 moves linearly with the assembly 16 (sliding over shaft 56) as the horizontal distance A thereof from the band saw blade 15 is adjusted. A crank 58 or the like is provided at the end of the shaft 56 for rotation of the shaft 50 a limited amount in either direction to provide for pivoting of the blade 18 from a vertical position and vice-versa. A suitable latching arrangement 60, similar to the latching arrangement 34 for crank 32, may be provided if desired, and additionally, a positive latching pin 62 associated directly with the shaft 50 and blade 18 (see FIG. 3), may be provided to insure that the blade 18 is in a vertical position.

Apparatus according to the invention having been described, a typical method of operation thereof will now be set forth: When it is desired to cut a piece of sheet metal so that two parallel edges thereof will be cut from a stock sheet, the raised upper surfaces 44 and 42 of the workpiece resting means 43 and 26 respectively are provided associated with band saw blade 15 and saber saw blade 18. By turning crank 32, the screw rod 28 is rotated so that the assembly 16 is adjusted with respect to the band saw blade 15 until the proper horizontal dimension A is provided corresponding to the width of the piece to be cut from the sheet metal. The crank 32 is latched in position by means 34, and crank 58 is rotated to bring blade 18 into its vertical position. It may be latched in its vertical position by positive locking pin 62. Then the motor 20 for the saber saw 16 and the motor in housing 11 for the band saw 14 are operated so that the blades 15 and 18 are operating in essentially the same cutting motion, and the apparatus 10 is ready to cut the sheet metal. The sheet metal is then placed on workpiece resting means 43, 26, and moved steadily toward the blades 15, 18 and cutting is initiated. Two parallel cuts — either arcuate or straight — will then be made in the sheet metal at the same time.

When it is desired to use only the band saw 14 for cutting (i.e., when there is no necessity for making two parallel cuts at the same time) but an arcuate cut is desired, the latching pin 62 is removed, and the crank 58 rotated to pivot the blade 18 from its vertical position (solid line in FIG. 3) to its horizontal position (dotted line in FIG. 3), below the table top 12. A pivot post 48 is then placed through the sheet material resting on means 26, and into opening 47, and the sheet metal is pivoted about post 48 into operative engagement with blade 15. Of course, the distance A is adjusted by rotating the crank 32 to insure that the proper width of material will be cut. When cutting is to be performed on sheet material other than sheet metal, the elevated surfaces 42, 44 of the workpiece resting means 26, 43 respectively, are not necessary.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. Apparatus for cutting sheet material and the like comprising:
    a generally horizontally disposed table top,
    a band saw having a toothed blade that is disposed in a generally vertical plane and passes through said table top,
    a saber saw having a toothed blade that is adapted to be disposed in a generally vertical plane parallel to the vertical plane of said band saw blade, said saber saw blade passing through the table top when disposed in said generally vertical plane,
    the teeth of said band and saber saw toothed blades being disposed on the same side of a vertical plane passing through said blades,
    means for mounting said saber saw to adjust the horizontal spacing thereof from the vertical plane of said band saw blade, and
    power means for operating said band saw and said saber saw, when in a generally vertical plane, at the same time so that a workpiece will have two parallel cuts made therein at the same time when brought into engagement with said saw blades.

2. Apparatus as recited in claim 1 further comprising means for pivoting said saber saw blade from a first position thereof wherein it is disposed in said generally vertical plane parallel to the plane of said band saw blade, to a second position thereof wherein said saber saw blade is in a generally horizontal position and disposed below the horizontal plane of the table top.

3. Apparatus as recited in claim 2 further comprising workpiece resting means carried by said saber saw and adjustable therewith with respect to said band saw, said resting means having means defining an opening therein for receipt of a pivot pin to allow pivoting of a workpiece about said pivot pin when said saber saw blade is in said second position thereof.

4. Apparatus as recited in claim 3 wherein said workpiece resting means is raised above the horizontal plane of the table top, and has a generally flat, horizontally disposed, upper surface thereof which extends above the generally horizontal plane of said table top.

5. Apparatus as recited in claim 4 wherein said workpiece resting means is mounted in a horizontally extending slot in said table top, said slot extending generally perpendicular to the vertical plane of said band saw blade, and wherein said resting means has means associated therewith for guiding the movement of said saber saw blade in said slot during adjustment thereof relative to said band saw vertical plane.

6. Apparatus as recited in claim 3 wherein said band saw has a workpiece resting means associated therewith, disposed adjacent the area of passage of said band saw blade through said table top, said workpiece resting means having an upper surface thereof which extends above the generally horizontal plane of said table top, and which upper surface is flat and is disposed in a generally horizontal plane.

7. Apparatus as recited in claim 1 wherein said means for mounting said saber saw to adjust the horizontal spacing thereof from the vertical plane of said band saw blade includes a mounting bracket for said saber saw, a threaded rod disposed under said table top, means for rotating said threaded rod in either direction, and means affixed to said mounting bracket for transforming the rotary movement of said threaded rod into linear movement of said mounting bracket.

8. Apparatus as recited in claim 7 wherein a motor for operating said saber saw is affixed to said mounting bracket, and wherein a motor separate from said saber saw motor is provided for operating said band saw.

9. Apparatus as recited in claim 2 further comprising a mounting bracket for said saber saw, means for pivotally mounting said saber saw blade and motor for operation thereof to said mounting bracket for said saber saw, and means for pivoting said saber saw blade and motor about said pivotal mount thereof from said first position to said second position thereof.

10. Apparatus as recited in claim 9 wherein said means for pivoting said saber saw blade includes a shaft disposed under said table top and operatively connected to said saber saw blade and motor, a gear member disposed on said shaft, a worm gear in cooperation with said gear member, and means for rotating said worm gear to in turn rotate said shaft, said rotating means including a keyed shaft.

* * * * *